(12) United States Patent
Yi et al.

(10) Patent No.: US 10,873,965 B2
(45) Date of Patent: Dec. 22, 2020

(54) METHOD FOR TRANSMITTING A BUFFER STATUS REPORT IN A WIRELESS COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/318,112

(22) PCT Filed: Aug. 4, 2017

(86) PCT No.: PCT/KR2017/008452
§ 371 (c)(1),
(2) Date: Jan. 15, 2019

(87) PCT Pub. No.: WO2018/026238
PCT Pub. Date: Feb. 8, 2018

(65) Prior Publication Data
US 2019/0254055 A1 Aug. 15, 2019

Related U.S. Application Data

(60) Provisional application No. 62/371,183, filed on Aug. 4, 2016, provisional application No. 62/371,197, filed on Aug. 4, 2016.

(51) Int. Cl.
*H04W 72/12* (2009.01)
*H04W 28/02* (2009.01)

(52) U.S. Cl.
CPC ... *H04W 72/1284* (2013.01); *H04W 28/0278* (2013.01)

(58) Field of Classification Search
CPC ......... H04W 28/0278; H04W 72/1284; H04W 28/0252
See application file for complete search history.

(56) References Cited

U.S. PATENT DOCUMENTS 9,060,293 B1 *  6/2015  Vivanco ............ H04W 52/0261
9,084,125 B2 *  7/2015  Chun ..................... H04L 1/1685
(Continued)

FOREIGN PATENT DOCUMENTS

WO      2014185647        11/2014
WO      2015012545         1/2015
WO      WO-2015045268 A1 *  4/2015 ........ H04W 72/0413

OTHER PUBLICATIONS

PCT International Application No. PCT/K2017/008452, Notification of Transmittal of the International Search Report and the Written Opinion of the International Searching Authority, or Declaration dated Nov. 15, 2017, 10 pages.
(Continued)

*Primary Examiner* — Parth Patel
*Assistant Examiner* — Berhanu D Belete
(74) *Attorney, Agent, or Firm* — Lee Hong Degerman Kang Waimey

(57) ABSTRACT

The present invention relates to a wireless communication system. More specifically, the present invention relates to a method and a device for transmitting, by a user equipment (UE), a buffer status report in a wireless communication system, the method comprising: receiving, by the UE, a message including information on a number N of lower entities to report an upper entity buffer size of a radio bearer; and transmitting, by N lower entities, the buffer status report including the upper entity buffer size, wherein the radio bearer comprises one upper entity and M lower entities, and wherein N≤M.

16 Claims, 14 Drawing Sheets

(56) References Cited

U.S. PATENT DOCUMENTS

| | | | | |
|---|---|---|---|---|
| 9,246,782 | B1* | 1/2016 | Vivanco | H04L 45/30 |
| 9,265,061 | B2* | 2/2016 | Yi | H04W 72/1284 |
| 9,660,918 | B1* | 5/2017 | Vivanco | H04L 5/0058 |
| 9,924,405 | B2* | 3/2018 | Chen | H04W 28/0252 |
| 2010/0118857 | A1* | 5/2010 | Chun | H04W 74/06 |
| | | | | 370/346 |
| 2010/0124237 | A1* | 5/2010 | Chun | H04W 72/1278 |
| | | | | 370/469 |
| 2010/0329135 | A1* | 12/2010 | Pelletier | H04W 72/1284 |
| | | | | 370/252 |
| 2012/0039204 | A1* | 2/2012 | Gao | H04W 72/0486 |
| | | | | 370/252 |
| 2014/0105112 | A1* | 4/2014 | Chun | H04L 1/1877 |
| | | | | 370/328 |
| 2015/0043547 | A1* | 2/2015 | Pelletier | H04W 28/0278 |
| | | | | 370/336 |
| 2015/0098322 | A1* | 4/2015 | Chen | H04W 28/0252 |
| | | | | 370/230 |
| 2015/0215944 | A1* | 7/2015 | Kim | H04L 5/001 |
| | | | | 370/329 |
| 2015/0245349 | A1* | 8/2015 | Jha | H04W 28/0278 |
| | | | | 370/329 |
| 2015/0327115 | A1 | 11/2015 | Park et al. | |
| 2016/0100397 | A1* | 4/2016 | Wen | H04W 24/10 |
| | | | | 370/329 |
| 2016/0142934 | A1 | 5/2016 | Ahmadzadeh et al. | |
| 2016/0337909 | A1* | 11/2016 | Cai | H04W 36/0033 |

OTHER PUBLICATIONS

Mediatek, "BSR and LCP for Dual Connectivity", 3GPP TSG RAN WG2 Meeting #85, R2-140197, Feb. 2014, 2 pages.
European Patent Office Application Serial No. 17837289.2, Search Report dated Jan. 23, 2020, 13 pages.
LG Electronics, "PDCP data indication to MAC with threshold", 3GPP TSG RAN WG2 Meeting #91, R2-153148, XP051040192, Aug. 2015, 4 pages.
LG Electronics, "BSR in dual connectivity", 3GPP TSG RAN WG2 Meeting #85, R2-140740, XP050792029, Feb. 2014, 2 pages.
Alcatel-Lucent, et al., "Discussion on UL bearer split for Dual connectivity: BSR triggers and timers", 3GPP TSG RAN WG2 Meeting #91, R2-153704, XP051004359, Aug. 2015, 4 pages.

* cited by examiner (a) Control-Plane Protocol Stack (b) User-Plane Protocol Stack

METHOD FOR TRANSMITTING A BUFFER STATUS REPORT IN A WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/008452, filed on Aug. 4, 2017, which claims the benefit of U.S. Provisional Application No. 62/371,183, filed on Aug. 4, 2016, and 62/371,197, filed on Aug. 4, 2016, the contents of which are all hereby incorporated by reference herein in their entirety.

TECHNICAL FIELD

The present invention relates to a wireless communication system and, more particularly, to a method for a buffer status report.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Based on the above-mentioned discussion, methods for transmitting a buffer status report in a wireless communication system and apparatuses therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method for transmitting, by a user equipment (UE), a buffer status report in a wireless communication system, the method comprising: receiving, by the UE, a message including information on a number N of lower entities to report an upper entity buffer size of a radio bearer; and transmitting, by N lower entities, the buffer status report including the upper entity buffer size, wherein the radio bearer comprises one upper entity and M lower entities, and wherein $N \le M$.

In accordance with another aspect of the present invention, A User Equipment (UE) for operating in a wireless communication system, the UE comprising: a radio frequency (RF) module configured to transmit/receive signals to/from a network; and a processor configured to receive, by the UE, a message including information on a number N of lower entities to report an upper entity buffer size of a radio bearer; and transmit, by N lower entities, the buffer status report including the upper entity buffer size, wherein the radio bearer comprises one upper entity and M lower entities, and wherein $N \le M$.

Preferably, M-N lower entities other than the N lower entities transmit a buffer status report not including the upper entity buffer size.

Preferably, if uplink data is available for transmission in the upper entity, the method further comprises indicating, by the upper entity, an upper entity buffer size to the N lower entities.

Preferably, the upper entity indicates the upper entity buffer size as zero to M-N lower entities other than the N lower entities.

Preferably, wherein the message further includes identity information for the N lower entities.

Preferably, the message further includes information on a first upper entity buffer size threshold value associated with N, if the upper entity buffer size is larger than or equal to the first upper entity buffer size threshold value, the N lower entities transmit the buffer status report including the upper entity buffer size, and if the upper entity buffer size is less than the first upper entity buffer size threshold value, all lower entities transmit the buffer status report not including the upper entity buffer size.

Preferably, the message further includes information on a number N1 of lower entities to report the upper entity buffer size and a second upper entity buffer size threshold value associated with N1, N≠N1 and the second upper entity buffer size threshold value is larger than the first upper entity buffer size threshold value, and if the upper entity buffer size is larger than or equal to the second upper entity buffer size threshold value, the N1 lower entities transmit the buffer status report including the upper entity buffer size.

Preferably, the upper entity corresponds to a packet data convergence protocol (PDCP), and the lower entity corresponds to a Medium access control (MAC).

It is to be understood that both the foregoing general description and the following detailed description of the present invention are exemplary and explanatory and are intended to provide further explanation of the invention as claimed.

Advantageous Effects

According to the present invention, the UE can transmit data associated with a radio bearer supporting a specific TTI duration.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
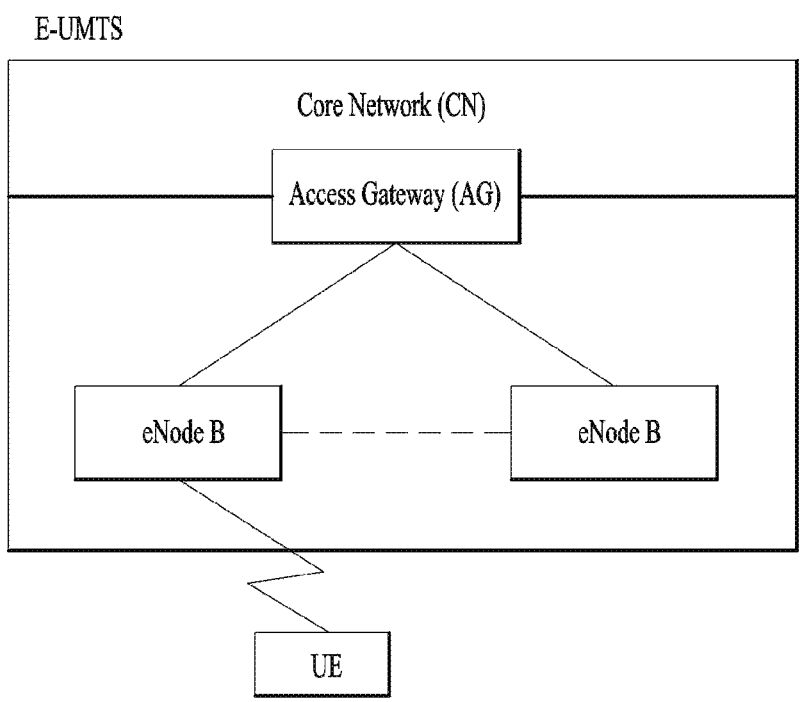
FIG. 1 is a diagram showing a network structure of an Evolved Universal Mobile Telecommunications System (E-UMTS) as an example of a wireless communication system.
Figure 2A:
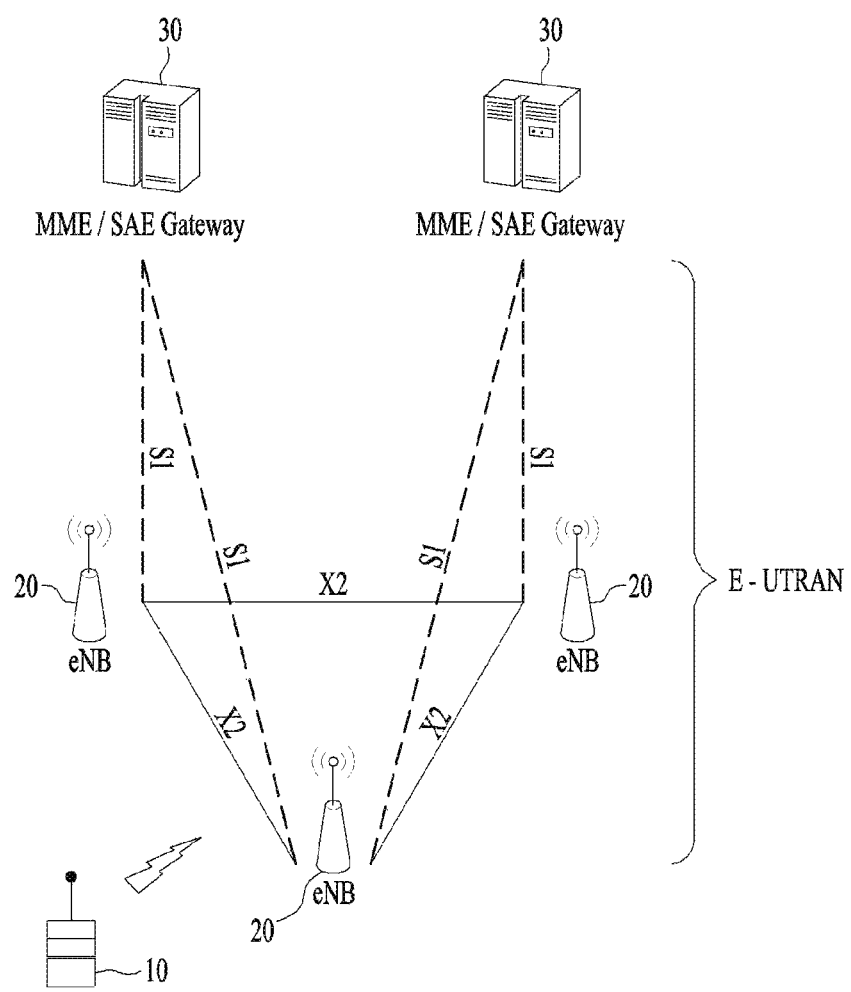
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
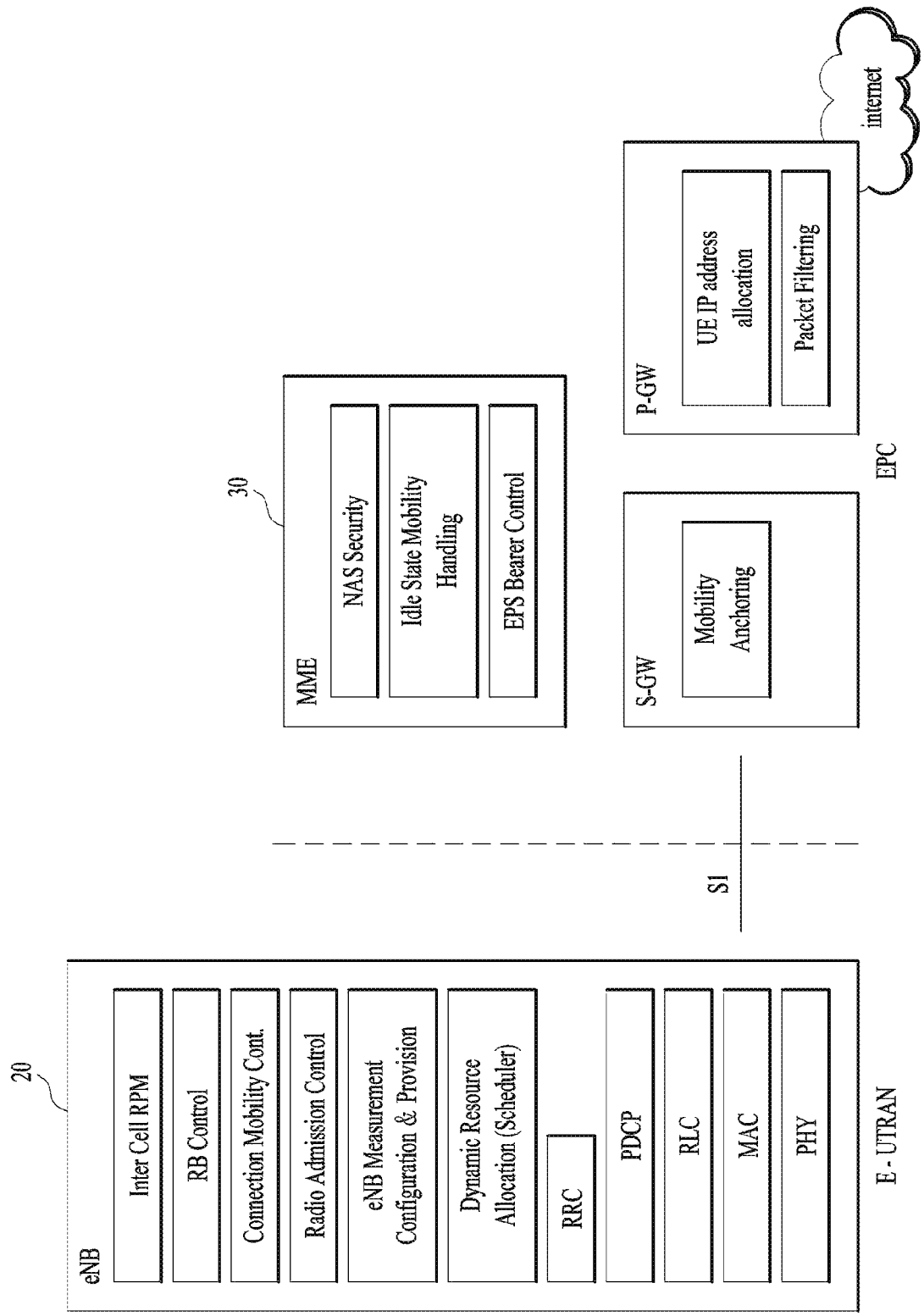
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
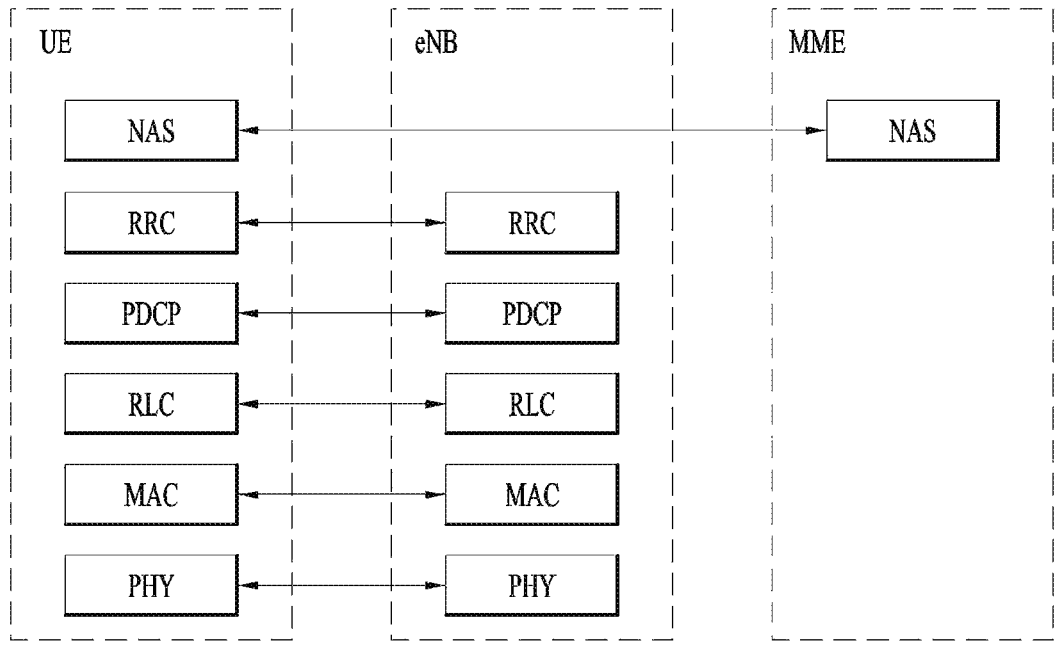
FIG. 3 is a diagram showing a control plane and a user plane of a radio interface protocol between a UE and an E-UTRAN based on a 3rd generation partnership project (3GPP) radio access network standard.
Figure 3:
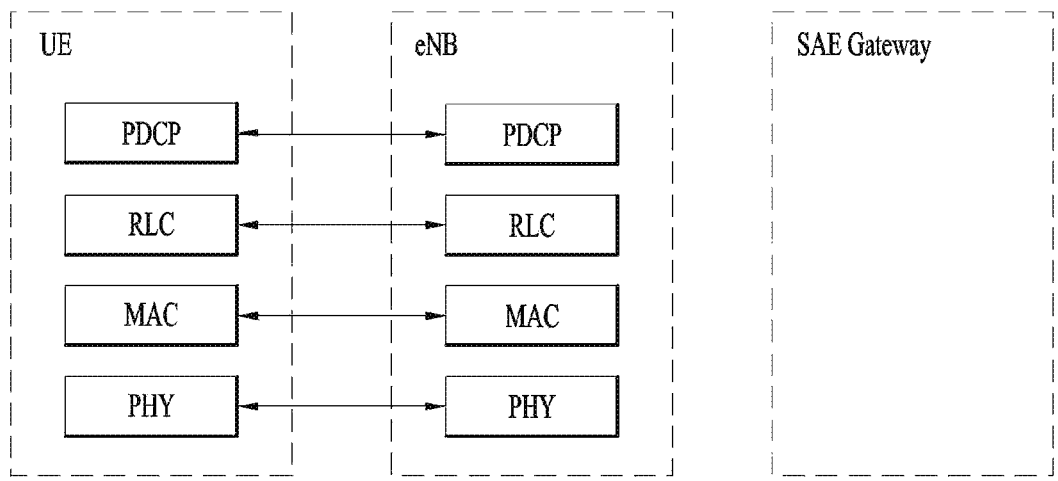

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
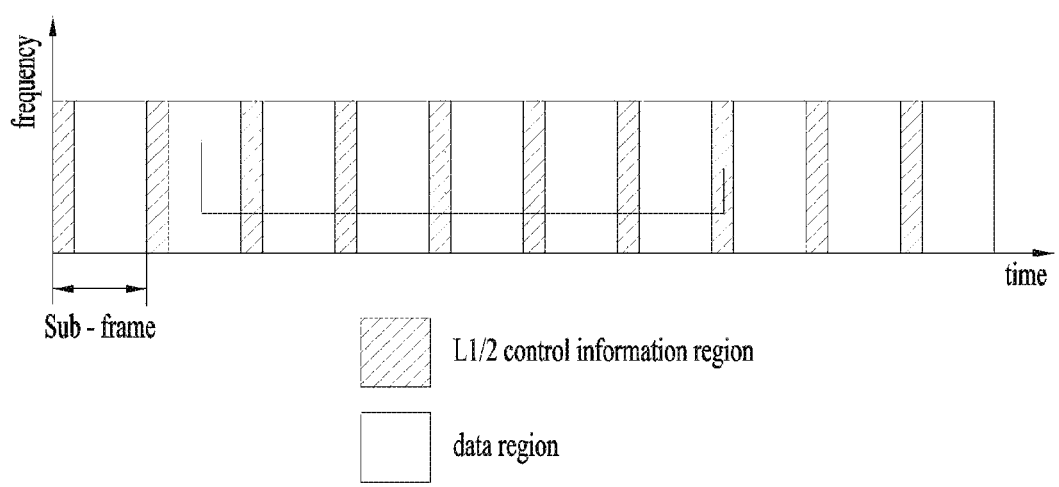
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
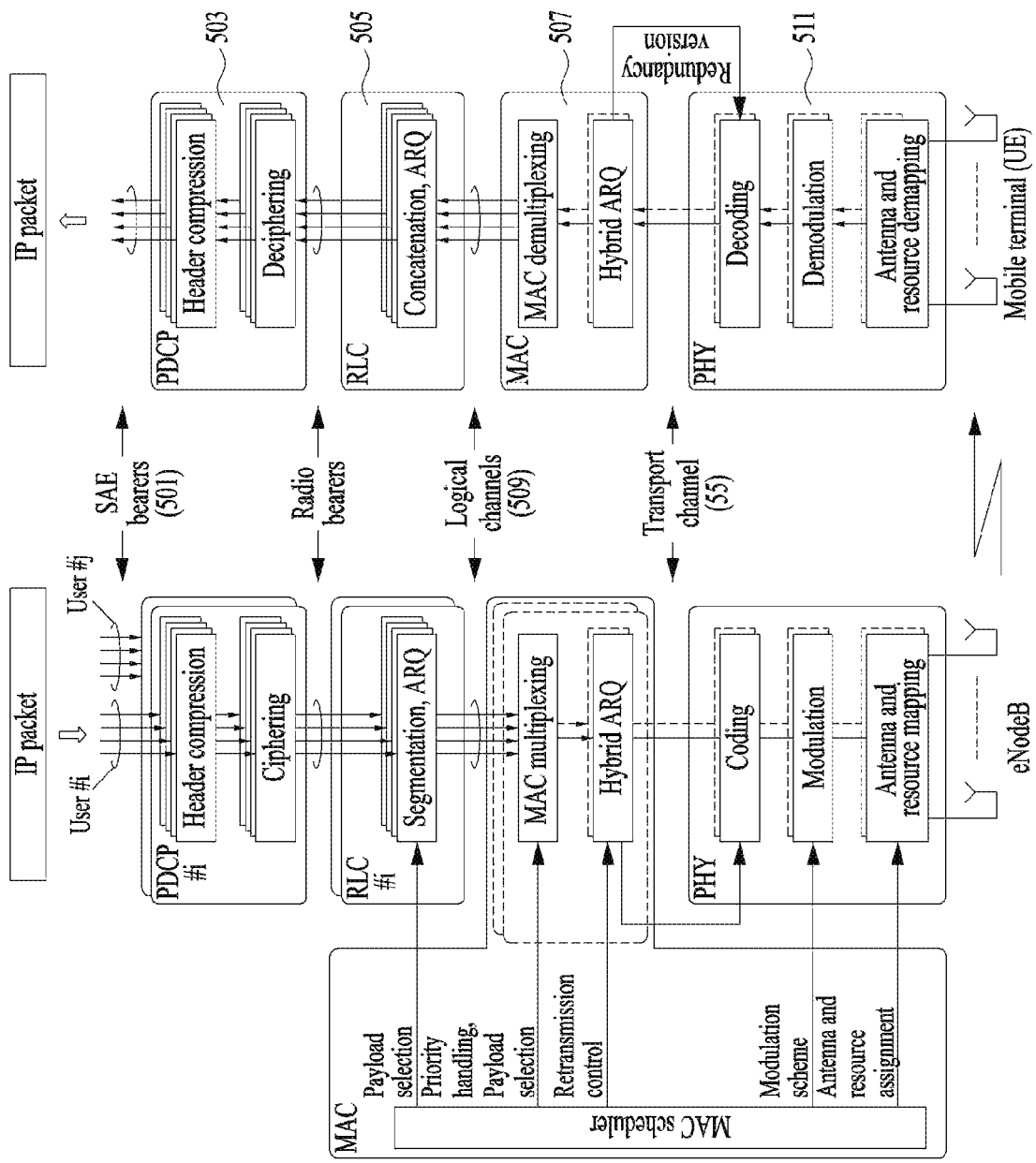
FIG. 5 is a diagram for a general overview of the LTE protocol architecture for the downlink.

FIG. 5 is a diagram for a general overview of the LTE protocol architecture for the downlink.

A general overview of the LTE protocol architecture for the downlink is illustrated in FIG. 5. Furthermore, the LTE protocol structure related to uplink transmissions is similar to the downlink structure in FIG. 5, although there are differences with respect to transport format selection and multi-antenna transmission.

Data to be transmitted in the downlink enters in the form of IP packets on one of the SAE bearers (501). Prior to transmission over the radio interface, incoming IP packets are passed through multiple protocol entities, summarized below and described in more detail in the following sections:

Packet Data Convergence Protocol (PDCP, 503) performs IP header compression to reduce the number of bits necessary to transmit over the radio interface. The header-compression mechanism is based on ROHC, a standardized header-compression algorithm used in WCDMA as well as several other mobile-communication standards. PDCP (503) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 505) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (505) offers services to the PDCP (503) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 507) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (507) offers services to the RLC (505) in the form of logical channels (509).

Physical Layer (PHY, 511), handles coding/decoding, modulation/demodulation, multi-antenna mapping, and other typical physical layer functions. The physical layer (511) offers services to the MAC layer (507) in the form of transport channels (513).

The Buffer Status Reporting (BSR) procedure is used to provide a serving eNB with information about the amount of data available for transmission in the UL buffers of the UE. RRC may control BSR reporting by configuring the two timers periodicB SR-Timer and retxB SR-Timer and by, for each logical channel, optionally signaling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs, and start or restart retxBSR-Timer.

Else if a Regular BSR has been triggered, if an uplink grant is not configured or the Regular BSR was not triggered due to data becoming available for transmission for a logical channel for which logical channel SR masking (logicalChannelSR-Mask) is setup by upper layers, a Scheduling Request shall be triggered.

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

In summary, the BSR is triggered in any of the following situation:

i) when data arrive for a logical channel which has higher priority than the logical channels whose buffers are not empty;

ii) when data become available for the UE's buffer, which is empty;

iii) when the retxBSR-Timer expires and there is still data in the UE's buffer;

iv) when a periodicB SR-Timer expires; or v) when the remaining space in a MAC PDU can accommodate a BSR.

The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority of the sidelink logical channel and the mapping between LCG ID and priority which is provided by upper layers in logicalChGroupInfoList. LCG is defined per ProSe Destination.

A sidelink Buffer Status Report (BSR) shall be triggered if any of the following events occur: if the MAC entity has a configured SL-RNTI i) SL data, for a sidelink logical channel of a ProSe Destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR", ii) UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR", iii) retx-BSR-TimerSL expires and the MAC entity has data available for transmission for any of the sidelink logical channels, in which case the Sidelink BSR is referred below to as "Regular Sidelink BSR", iv) periodic-BSR-TimerSL expires, in which case the Sidelink BSR is referred below to as "Periodic Sidelink BSR". Else, An SL-RNTI is configured by upper layers and SL data is available for transmission in the RLC entity or in the PDCP entity, in which case the Sidelink BSR is referred below to as "Regular Sidelink BSR".

For Regular and Periodic Sidelink BSR, if the number of bits in the UL grant is equal to or larger than the size of a Sidelink BSR containing buffer status for all LCGs having data available for transmission plus its subheader, the MAC entity reports Sidelink BSR containing buffer status for all LCGs having data available for transmission. Else, the MAC entity reports Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled: if the MAC entity has UL resources allocated for new transmission for this TTI and the allocated UL resources can accommodate a Sidelink BSR MAC control element plus its subheader as a result of logical channel prioritization, the MAC entity instructs the Multiplexing and Assembly procedure to generate the Sidelink BSR MAC control element(s), starts or restarts periodic-BSR-TimerSL except when all the generated Sidelink BSRs are Truncated Sidelink BSRs, and starts or restarts retx-BSR-TimerSL. Else if a Regular Sidelink BSR has been triggered, if an uplink grant is not configured, a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

Figure 6:
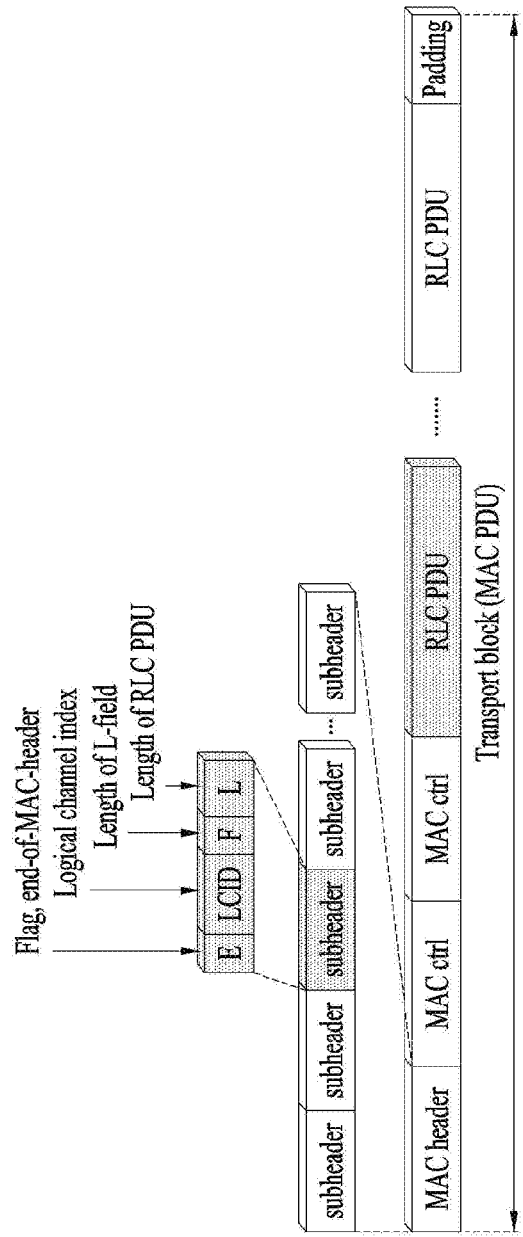
FIG. 6 is a diagram for MAC header and SDU (Service Data Unit) multiplexing.

FIG. 6 is a diagram for MAC header and SDU (Service Data Unit) multiplexing.

The MAC layer handles logical-channel multiplexing, hybrid-ARQ retransmissions, and uplink and downlink scheduling. It is also responsible for multiplexing/demultiplexing data across multiple component carriers when carrier aggregation is used.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC header, shown in FIG 6, is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information.

Furthermore, the length field in the sub-header is removed for control elements with a fixed length.

Generally, one UE has a radio bearer comprising one PDCP entity, one RLC entity and one MAC entity. The MAC entity is performed for a base station with which the radio bearer is connected. However, there are cases that one UE has two different MAC entities sometimes (i.e. Dual Connectivity, Pro-Se, etc.).

Figure 7:
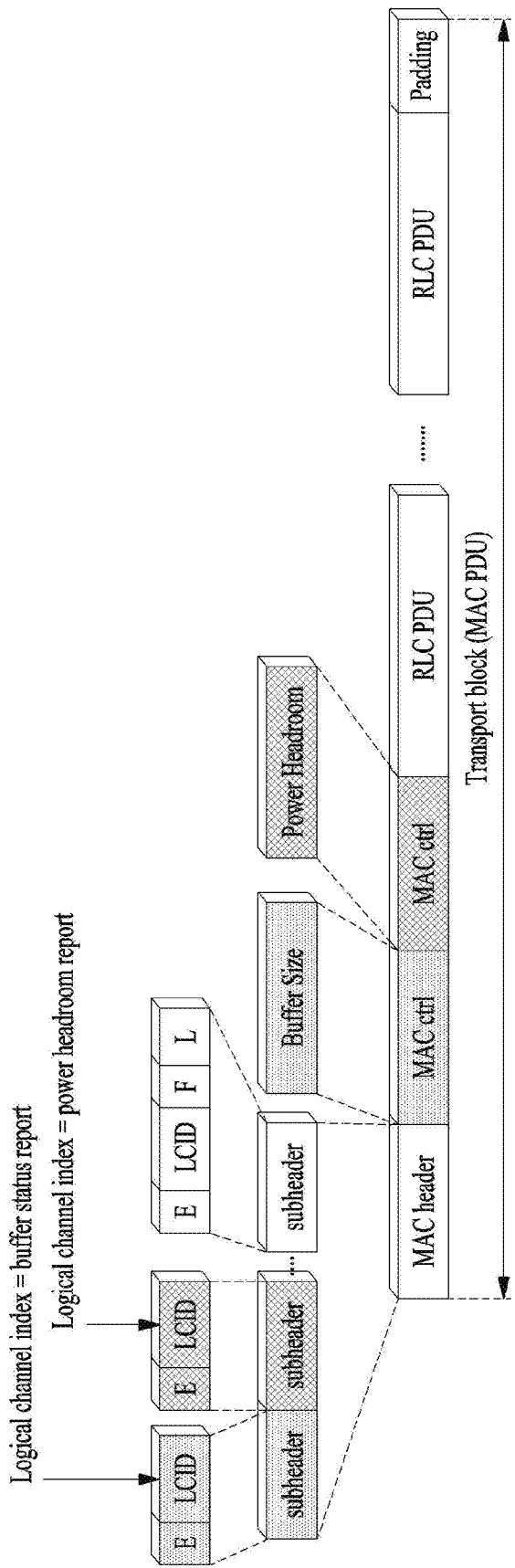
FIG. 7 is a diagram for signaling of buffer status and power-headroom reports.

FIG. 7 is a diagram for signaling of buffer status and power-headroom reports.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

The use of a single bit for the scheduling request is motivated by the desire to keep the uplink overhead small, as a multi-bit scheduling request would come at a higher cost. A consequence of the single bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 7.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group. A buffer status report represents one or all four logical-channel groups and can be triggered for the following reasons:

i) Arrival of data with higher priority than currently in the transmission buffer—that is, data in a logical-channel group with higher priority than the one currently being transmitted—as this may impact the scheduling decision.

ii) Change of serving cell, in which case a buffer-status report is useful to provide the new serving cell with information about the situation in the terminal.

iii) Periodically as controlled by a timer.

iv) Instead of padding. If the amount of padding required to match the scheduled transport block size is larger than a buffer-status report, a buffer-status report is inserted. Clearly it is better to exploit the available payload for useful scheduling information instead of padding if possible.

Figure 8:
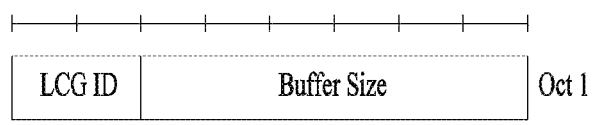
FIG. 8 is a diagram for short BSR MAC CE.
Figure 9:
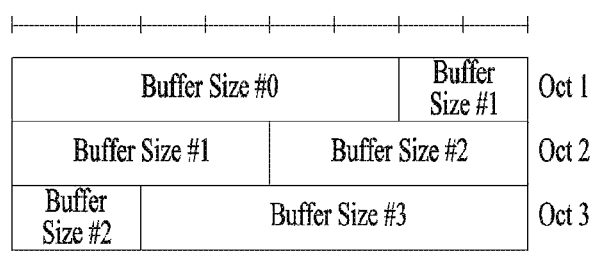
FIG. 9 is a diagram for long BSR MAC CE.

FIG. 8 is a diagram for short BSR MAC CE, and FIG. 9 is a diagram for long BSR MAC CE.

The Buffer Status Reporting (BSR) procedure is used to provide a serving eNB with information about the amount of data available for transmission (DAT) in the UL buffers of the UE. RRC may control BSR reporting by configuring the two timers periodicBSR-Timer and retxBSR-Timer and by, for each logical channel, optionally signalling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

Buffer Status Report (BSR) MAC control elements consist of either: i) Short BSR and Truncated BSR format: one LCG ID field and one corresponding Buffer Size field (FIG. 8) or ii) Long BSR format: four Buffer Size fields, corresponding to LCG IDs #0 through #3 (FIG. 9).

The BSR formats are identified by MAC PDU subheaders with LCIDs as specified in Table 1.

TABLE 1

| Index | LCID values |
|---|---|
| 00000 | CCCH |
| 00001-01010 | Identity of the logical channel |
| 01011-10110 | Reserved |
| 10111 | ProSe Truncated BSR |
| 11000 | ProSe BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

The fields LCG ID and Buffer Size are defined as follow:

LCG ID: The Logical Channel Group ID field identifies the group of logical channel(s) which buffer status is being reported. The length of the field is 2 bits;

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission. The size of the RLC and MAC headers are not considered in the buffer size computation. The length of this field is 6 bits. If extendedBSR-Sizes is not configured, the values taken by the Buffer Size field are shown in Table 2. If extendedBSR-Sizes is configured, the values taken by the Buffer Size field are shown in Table 3.

TABLE 2

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 3

| Index | Buffer Size (BS) value [bytes] |
| --- | --- |
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

If a UE is connected to one eNB, the eNB is responsible for scheduling of the UE. Therefore, the UE reports its buffer status to the eNB in order to request the uplink resource.

In Dual Connectivity, the UE can be scheduled by two eNBs. Therefore, the UE reports its buffer status to both eNBs as duplicated. As the UE reports its buffer status to all eNBs, e.g., when the amount of PDCP data is equal to or larger than a threshold, the UE is provided uplink resource from all eNBs which would be larger than the amount of data in the buffer. Accordingly, it is inevitable to avoid waste of uplink resource. However, one assumption in allowing duplicated BSR towards all eNBs was that waste of resource may happen at the end of data burst and/or both eNBs may coordinate each other via network implementation.

In New RAT, the UE may be scheduled by multiple scheduling nodes, e.g., Distributed Units (DU), which would schedule the UE by considering radio condition between the UE and the scheduling node. Applying the same rule of Dual Connectivity to New RAT, the UE would report its buffer size to all scheduling nodes. Then, duplicated BSR operation would lead to a significant waste of uplink resources. Furthermore, it may be more complicated and not easy to coordinate/negotiate between all those scheduling nodes.

Figure 10:
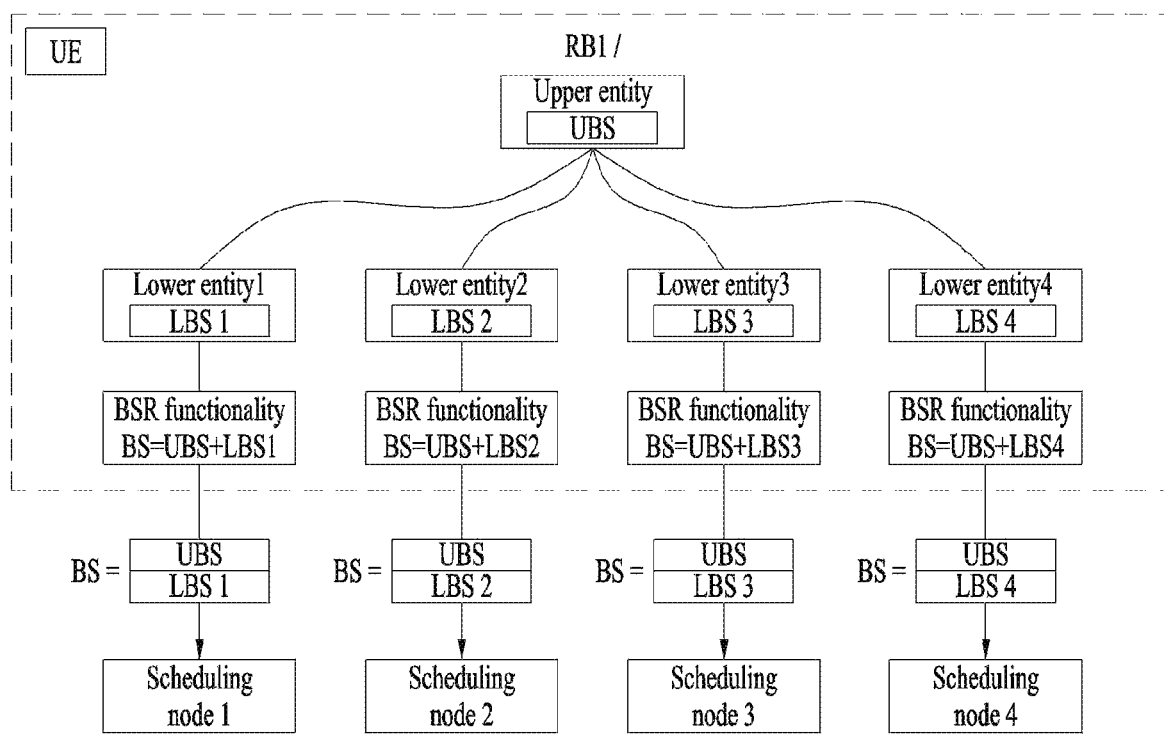
FIG. 10 is an exemplary diagram illustrating legacy BSR operation in multiple Connectivity.

FIG. 10 is an exemplary diagram illustrating legacy BSR operation in multiple Connectivity. Referring to FIG. 10, a UE may have a plurality of lower entities (e.g. lower entity 1 to lower entity 4) connected to a upper entity, and each lower entity may receive information on a buffer size from an upper entity. Then, each lower entity adds the buffer size of the upper entity received together with its buffer size (e.g. Buffer Size 1=Buffer Size of upper entity+Buffer Size of lower entity 1), and transmits the BSR to each scheduling node. In this case, as mentioned above, duplicated BSRs may be transmitted, which may result in waste of uplink resources. Therefore, a new mechanism is needed to report the UE's buffer size to only a part of scheduling nodes.

In the present invention, the following can be assumed.

Multiple-split bearer is a radio bearer that can be scheduled by multiple scheduling nodes, e.g., three scheduling nodes.

A multiple-split bearer comprises one upper entity and multiple lower entities, each of which has its own buffer for that bearer.

Upper entity refers, e.g. PDCP, while lower entity refers, e.g., RLC or MAC.

In New RAT, the lower entity may include/perform BSR functionality, which is located in MAC entity in LTE.

In LTE, the upper entity buffer refers PDCP buffer and the lower entity buffer refers RLC buffer, while the BSR functionality is performed in MAC entity, which is also called as lower entity in this invention.

Each lower entity corresponds to one eNB.

Figure 11:
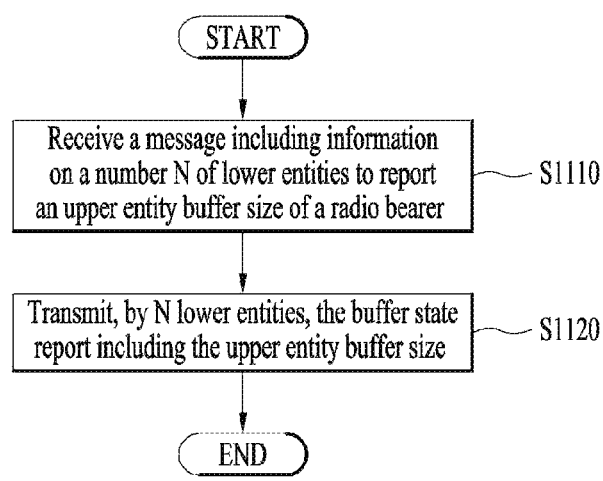
FIG. 11 is a flowchart according to an embodiment of the present invention.

FIG. 11 is a flowchart according to an embodiment of the present invention.

Referring to FIG. 11, the UE may receive a message including information on a number N of lower entities to report an upper entity buffer size of a radio bearer (S1110). The information may be an indication including lower entity identities of lower entities to report the upper entity buffer size. As an example, a multiple-split bearer may be configured to a UE. For example, M lower entities may be configured to the UE for one radio bearer. The UE may receive a radio bearer (RB) configuration including an indication indicating zero or more lower entity (e.g. N lower entities among the M lower entities, N≤M) which should consider an upper entity buffer size (UBS) of the radio bearer when the lower entity performs a BSR operation. The indication may be called 'LE Indication'. The 'LE Indication' may be layer 3, 2, or 1 signal including zero or more lower entity identifier for a radio bearer. In addition, for different RB, the LE Indication may indicate different lower entity identifiers, or different number of lower entity identifiers.

Subsequently, the N lower entities may transmit the buffer status report including the upper entity buffer size to the scheduling nodes (S1120). For example, if uplink data is available for transmission in the upper entity, the upper entity may indicate the UBS to a lower entity which is indicated by the LE Indication (e.g. N lower entities). In addition, the upper entity may indicate the UBS as zero to lower entities which is not indicated by the LE Indication (e.g. M-N lower entities). Alternatively, the upper entity may not indicate the UBS to the lower entity.

For example, the lower entity indicated by the LE Indication may perform the BSR operation by reporting the buffer size of the RB as sum of UBS and lower entity buffer size (LBS) of the lower entity indicated by the LE Indication (e.g. UBS+LBS). On the other hand, the lower entity not indicated by the LE Indication may set the buffer size of the RB only by the LBS (e.g. UBS+LBS=0+LBS). Thereafter, each lower entity transmits its calculated buffer size of the RB to the corresponding scheduling node in the network.

Figure 12:
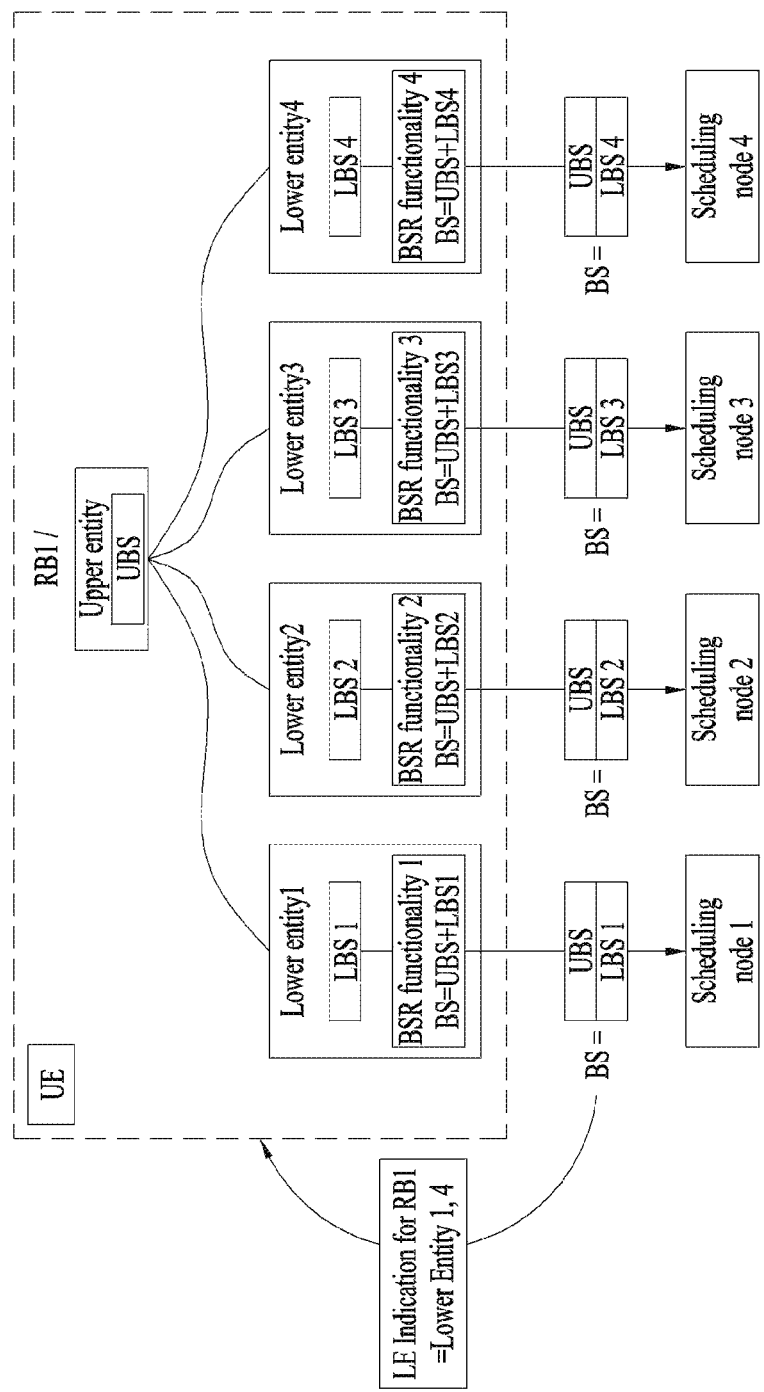
FIG. 12 and FIG. 13 are exemplary diagram for explaining an embodiment of the present invention.

FIG. 12 is an exemplary diagram for explaining an embodiment of the present invention.

Referring to FIG. 12, the UE is configured with a multi-split bearer RB1 which comprises one Upper entity and 4 Lower entities. The UE may receive a LE Indication for RB1 including an Lower entity identifier 1 and 4. In this example, the upper entity of RB1 may indicate UBS to the lower entity 1 and 4. In addition, the upper entity of RB1 may indicate UBS as zero to the lower entity 2 and 3. Subsequently, each lower entity of the RB1 performs the BSR operation by reporting the buffer size of the RB as sum of UBS and LBS of the RB. At this time, the buffer size may be set as follows: i) The lower entity 1 of the RB1 sets the buffer size of the RB1 as 'UBS+LBS1', ii) The lower entity 2 of the RB1 sets the buffer size of the RB1 as 'UBS+LBS2=LBS2', iii) The lower entity 3 of the RB1 sets the buffer size of the RB1 as 'UBS+LBS3=LBS3', and iv) The lower entity 4 of the RB1 sets the buffer size of the RB1 as 'UBS+LBS4'.

After setting the buffer size, each lower entity transmits its calculated buffer size of the RB to the corresponding scheduling node in the network.

For another embodiment, the UE may receive the LE Indication further include UBS threshold (UBS TH) for a radio bearer. The UBS TH may be an upper buffer size threshold value used in UBS indication to the lower layer. The upper entity may indicate the UBS to the lower entity indicated via the LE Indication by comparing the UBS and UBS TH.

For example, if UBS is equal to or larger than UBS TH, the upper entity may indicate the UBS to the lower entity which is indicated by the LE Indication. On the other hand, if UBS is less than UBS TH, the upper entity may not indicate the UBS to the lower entity which is indicated by the LE Indication. In this example, the upper entity may not indicate the UBS to the lower entity not indicated by the LE Indication regardless of whether UBS is less than UBS TH or not.

For another example, the UE may receive a message including information on a number N1 of lower entities and a number N2 of lower entities to report an upper entity buffer size of a radio bearer. In this example, if the UBS is larger than or equal to the UBS TH, the N1 lower entities transmit the buffer status report including the upper entity buffer size. On the other hand, if the UBS is less than the UBS TH, N2 lower entities transmit the buffer status report including the upper entity buffer size.

For another example, the LE Indication may include multiple UBS THs for a radio bearer and multiple sets of lower entity identifiers. At this, the upper entity may indicates the UBS to a certain set of lower entities of the RB which is indicated via the LE Indication by comparing the UBS and UBS THs. Each set of lower entity identifiers may have the same or different lower entity identifier. The number of sets of lower entity identifiers is larger than the number of UBS THs.

In this example, if two UBS THs are included in the LE indication, total three sets of lower entity identifiers are included in the LE indication. As an example, if 0≤UBS<UBS TH1, the upper entity of the RB indicates the UBS to the lower entity Set 1 of the RB which is indicated by the LE Indication. Alternatively, if UBS TH1≤UB<UBS TH2, the upper entity of the RB indicates the UBS to the lower entity Set 2 of the RB which is indicated by the LE Indication. Alternatively, if UBS TH2<UBS, the upper entity of the RB indicates the UBS to the lower entity Set 3 of the RB which is indicated by the LE Indication.

Figure 13:
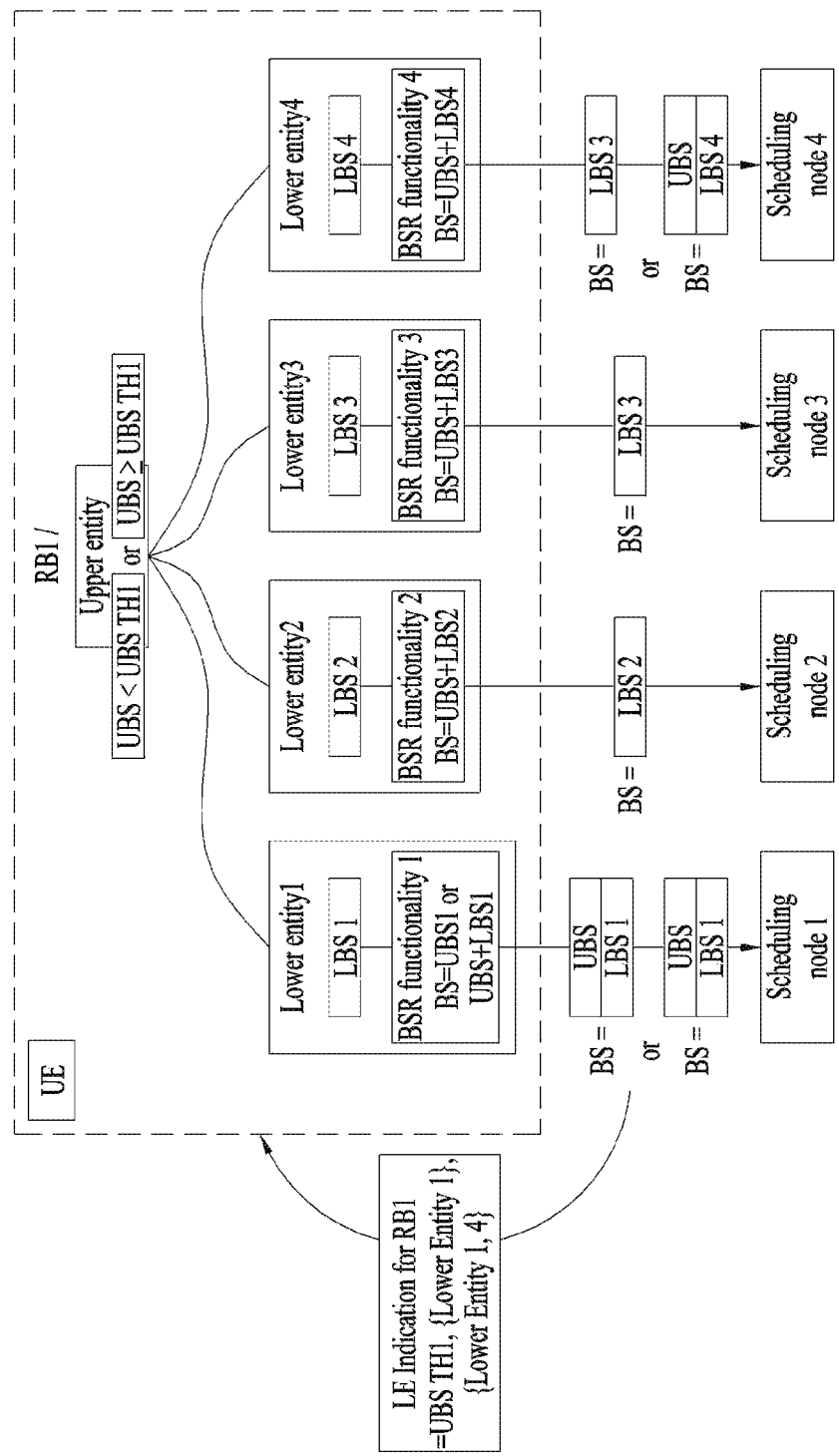

FIG. 13 is an exemplary diagram for explaining an embodiment of the present invention.

Referring to FIG. 13, the UE is configured with a multi-split bearer RB1 which comprises one Upper entity and 4 Lower entities. The UE may receive a LE Indication for RB1 including a UBS TH1, and two sets of lower entity identifiers, Set1={lower entity 1}, Set2={lower entity 1,4}. For example, if UBS<UBS TH1, the upper layer may indicate UBS to lower entity 1. Alternatively, if UBS TH2≤UBS, the upper layer may indicate UBS to lower entity 1 and lower entity 4. In addition, the upper layer indicates UBS as zero to lower entity 2 and 3 regardless of the UBS.

Each lower entity of the RB1 performs the BSR operation by reporting the buffer size of the RB as sum of UBS and LBS of the RB.

For example, if UBS<UBS TH1, i) The lower entity 1 of the RB1 sets the buffer size of the RB1 as 'UBS+LBS1', ii) The lower entity 2 of the RB1 sets the buffer size of the RB1 as 'UBS+LBS2=LBS2', iii) The lower entity 3 of the RB1 sets the buffer size of the RB1 as 'UBS+LBS3=LBS3', and iv) The lower entity 4 of the RB1 sets the buffer size of the RB1 as 'UBS+LBS4=LBS4'.

Alternatively, if UBS TH2≤UBS, i) The lower entity 1 of the RB1 sets the buffer size of the RB1 as 'UBS+LBS1', ii) The lower entity 2 of the RB1 sets the buffer size of the RB1 as 'UBS+LBS2=LBS2', iii) The lower entity 3 of the RB1 sets the buffer size of the RB1 as 'UBS+LBS3=LBS3', and iv) The lower entity 4 of the RB1 sets the buffer size of the RB1 as 'UBS+LBS4'.

After setting the buffer size, each lower entity transmits its calculated buffer size of the RB to the corresponding scheduling node in the network.

In the present invention, the upper entity may correspond to a packet data convergence protocol (PDCP), and the lower entity may correspond to a Medium access control (MAC).

Figure 14:
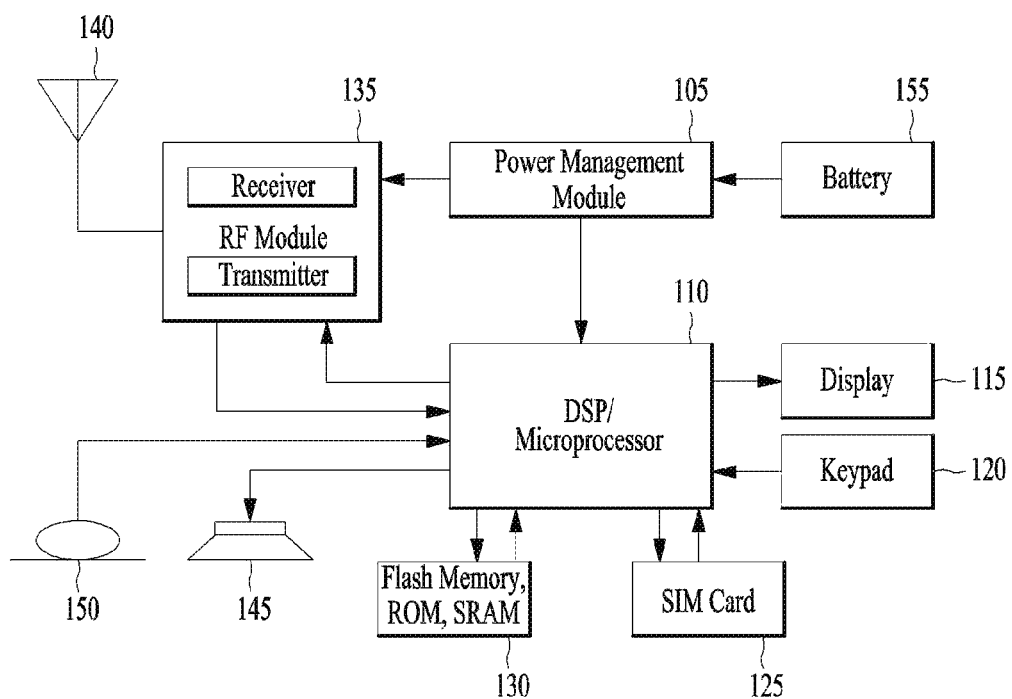
FIG. 14 is a block diagram of a communication apparatus according to an embodiment of the present invention.

FIG. 14 is a block diagram of a communication apparatus according to an embodiment of the present invention.

The apparatus shown in FIG. 14 can be a user equipment (UE) and/or eNB adapted to perform the above mechanism, but it can be any apparatus for performing the same operation.

As shown in FIG. 14, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 14 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 14 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. The processor (110) is configured to perform operations according to the embodiment of the present invention exemplarily described with reference to the accompanying drawings. In particular, the detailed operations of the processor (110) can refer to the contents described with reference to FIGS. 1 to 13.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for transmitting, by a user equipment (UE), a buffer status report in a wireless communication system, the method comprising:
  receiving, by the UE, a message including information on a number N of lower entities to report an upper entity buffer size of a radio bearer; and
  transmitting the buffer status report to each of M scheduling nodes,
  wherein the UE is scheduled by the M scheduling nodes,
  wherein the radio bearer comprises one upper entity and M lower entities, and the M lower entities are comprised in the radio bearer based on the M scheduling nodes,
  wherein the buffer status report transmitted to each of the M scheduling nodes comprises a first buffer status report transmitted by N lower entities of the M lower entities and that includes the upper entity buffer size and a corresponding lower entity buffer size, and a second buffer status report that is transmitted by M−N lower entities other than the N lower entities and that includes the corresponding lower entity buffer size, and
  wherein N≤M, and M is larger than two.

2. The method of claim 1, further comprising:
  based on uplink data being available for transmission in the upper entity, indicating, by the upper entity, the upper entity buffer size to the N lower entities.

3. The method of claim 2, wherein the upper entity indicates the upper entity buffer size as zero to the M−N lower entities other than the N lower entities.

4. The method of claim 1, wherein the message further includes identity information for the N lower entities.

5. The method of claim 1,
  wherein the message further includes information on a first upper entity buffer size threshold value associated with N,
  wherein based on the upper entity buffer size being larger than or equal to the first upper entity buffer size threshold value, the N lower entities transmit the buffer status report including the upper entity buffer size, and
  wherein based on the upper entity buffer size being less than the first upper entity buffer size threshold value, the M lower entities transmit the buffer status report not including the upper entity buffer size.

6. The method of claim 5,
  wherein the message further includes information on a number N1 of lower entities to report the upper entity buffer size and a second upper entity buffer size threshold value associated with N1,
  wherein N≠N1 and the second upper entity buffer size threshold value is larger than the first upper entity buffer size threshold value, and
  wherein based on the upper entity buffer size being larger than or equal to the second upper entity buffer size threshold value, the N1 lower entities transmit the buffer status report including the upper entity buffer size.

7. The method of claim 1, wherein:
the upper entity corresponds to a packet data convergence protocol (PDCP) entity, and
the lower entity corresponds to a Medium access control (MAC) entity.

8. The method of claim 1, wherein the second buffer status report does not include the upper entity buffer size.

9. A user equipment (UE) in a wireless communication system, the UE comprising:
a radio frequency (RF) module including a transceiver configured to transmit/receive signals to/from a network; and
a processor configured to process the signals,
wherein the processor is configured to:
receive, by the UE, a message including information on a number N of lower entities to report an upper entity buffer size of a radio bearer; and
transmit the buffer status report to each of M scheduling nodes,
wherein the UE is scheduled by M scheduling nodes,
wherein the radio bearer comprises one upper entity and M lower entities, and the M lower entities are comprised in the radio bearer based on the M scheduling nodes, and
wherein the buffer status report transmitted to each of the M scheduling nodes comprises a first buffer status report transmitted by N lower entities of the M lower entities and that includes the upper entity buffer size and a corresponding lower entity buffer size, and a second buffer status report that is transmitted by M−N lower entities other than the N lower entities and that includes the corresponding lower entity buffer size, and
wherein N≤M, and M is larger than two.

10. The UE of claim 9, wherein the processor is further configured to indicate, by the upper entity, the upper entity buffer size to the N lower entities, based on uplink data being available for transmission in the upper entity.

11. The UE of claim 10, wherein the upper entity indicates the upper entity buffer size as zero to the M−N lower entities other than the N lower entities.

12. The UE of claim 9, wherein the message further includes identity information for the N lower entities.

13. The UE of claim 9,
wherein the message further includes information on a first upper entity buffer size threshold value associated with N,
wherein based on the upper entity buffer size being larger than or equal to the first upper entity buffer size threshold value, the N lower entities transmit the buffer status report including the upper entity buffer size, and
wherein based on the upper entity buffer size being less than the first upper entity buffer size threshold value, the M lower entities transmit the buffer status report not including the upper entity buffer size.

14. The UE of claim 13,
wherein the message further includes information on a number N1 of lower entities to report the upper entity buffer size and a second upper entity buffer size threshold value associated with N1,
wherein N≠N1 and the second upper entity buffer size threshold value is larger than the first upper entity buffer size threshold value, and
wherein based on the upper entity buffer size being larger than or equal to the second upper entity buffer size threshold value, the N1 lower entities transmit the buffer status report including the upper entity buffer size.

15. The UE of claim 9, wherein:
the upper entity corresponds to a packet data convergence protocol (PDCP) entity, and
the lower entity corresponds to a Medium access control (MAC) entity.

16. The UE of claim 9, wherein the second buffer status report does not include the upper entity buffer size.

* * * * *